(12) United States Patent
Lapere

(10) Patent No.: US 6,272,463 B1
(45) Date of Patent: Aug. 7, 2001

(54) MULTI-RESOLUTION SYSTEM AND METHOD FOR SPEAKER VERIFICATION

(75) Inventor: Martine Lapere, Knokke-Heist (BE)

(73) Assignee: Lernout & Hauspie Speech Products N.V.

( * ) Notice: Subject to any disclaimer, the term of this patent is extended or adjusted under 35 U.S.C. 154(b) by 0 days.

(21) Appl. No.: 09/261,271

(22) Filed: Mar. 3, 1999

Related U.S. Application Data

(63) Continuation-in-part of application No. 09/229,076, filed on Jan. 12, 1999.
(60) Provisional application No. 60/076,680, filed on Mar. 3, 1998.

(51) Int. Cl.$^7$ .................................................. G10L 15/06
(52) U.S. Cl. ..................... 704/248; 704/243; 704/273; 704/253
(58) Field of Search ................................. 704/246, 247, 704/248, 249, 250, 273, 251, 253, 254, 255, 243, 260, 257, 256

(56) References Cited

U.S. PATENT DOCUMENTS

| | | | |
|---|---|---|---|
| 5,668,929 | * 9/1997 | Foster, Jr. ........................... | 704/273 |
| 5,675,704 | 10/1997 | Juang et al. ........................ | 395/2.55 |
| 5,687,287 | 11/1997 | Gandhi et al. ...................... | 395/2.56 |
| 5,752,231 | * 5/1998 | Gammel et al. .................... | 704/273 |

OTHER PUBLICATIONS

Dr. Bruno Beek et al.; Speaker Authentication and Voice Data Entry; 21st Midwest symposium on Circuits and Systems Ames, IA, USA, Aug. 14–15, 1978. pp. 266–273.*

Higgins, A., et al, "Speaker Verification Using Randomized Phraise Prompting", *Digital Signal Processing*, vol. 1, No. 2, Apr. 1, 1991, pp. 89–106.

Matsui, Tomoko, et al, "Concatenated Phoneme Models for Text–Variable Speaker Recognition,", *ICASSP–93*, IEEE International Conference on Acoustics, Speech and Signal Processing, vol. 2, Apr. 27–30, 1993, pp. 391–394.

Siu, Man–Hung, "An Unsupervised, Sequential Learning Algoithm for the Segmentation of Speech Waveforms with Multiple Speakers", *IEEE*, Sep. 1992, pp. 189–192.

\* cited by examiner

*Primary Examiner*—Richemond Dorvil
*Assistant Examiner*—Abulk Azad
(74) *Attorney, Agent, or Firm*—Bromberg & Sunstein LLP

(57) ABSTRACT

A method is given for generating a speaker-dependant model of an utterance that has at least one occurrence. The method includes generating an initial model, having a first resolution, that encodes each of the occurrences of the utterance; and generating at least one additional speaker-specific model, having a different resolution from that of the initial model, of all occurrences of the utterance.

12 Claims, 4 Drawing Sheets

MULTI-RESOLUTION SYSTEM AND METHOD FOR SPEAKER VERIFICATION

This application is a continuation-in-part of U.S. application No. 09/229,076, filed Jan. 12, 1999, and also claims the benefit of U.S. Provisional application Ser. No. 60/076,680, filed Mar. 3, 1998. These applications are incorporated herein by reference.

TECHNICAL

The present invention relates to digital speech processing, and more particularly, to verification of the identity of a given speaker.

BACKGROUND ART

Speech possesses multiple acoustic characteristics which vary greatly between individuals according to such diverse factors as vocal tract size, gender, age, native dialect, education, and idiosyncratic articulator movements. These factors are so specifically correlated to individual speakers that listeners often can readily determine the identity of a recognized speaker within the first few syllables heard. Considerable effort has been expended to develop artificial systems which can similarly determine and verify the identity of a given speaker.

Speaker verification systems may be broadly divided into free-text passphrases systems and text-dependent systems. Each type of system has its difficulties. To accommodate free-text passphrases, the storage and match processes must accommodate virtually any utterance. This higher acoustic-phonetic variability imposes longer training sessions in order to reliably characterize, or model, a speaker. In addition, free-text systems are not able to model speaker specific co-articulation effects caused by the limited movements of the speech articulators. Moreover, the ability to accommodate virtually any utterance exists in tension with the ability to discriminate among a wide range of speakers—the greater the vocabulary range, the more challenging it is to simultaneously provide both reliable word storage, and discriminate among speakers.

Text-dependent systems, on the other hand, permit easier discrimination between multiple speakers. In text-dependent passphrase systems, one or more preselected passphrases is modeled for each individual user. The models reflect both individual-specific acoustic characteristics as well as lexical and syntactic content of the passphrase. In contrast to free-text systems, fairly short utterances (typically, just a few seconds) are adequate for training in text-dependent systems. However, too narrow a scope of acceptable text may make a text-dependent system more vulnerable to replay attack. Text-dependent systems can be further sub-classified as either fixed passphrase systems, where the passphrase was defined at design time, or as freely chosen passphrase systems equipped with an online training procedure. The specific techniques utilized correspond generally to the recognized techniques of automatic speech recognition—acoustic templates, hidden Markov models (HMM), artificial neural networks, etc.

Text-prompted approaches with multiple passphrases were introduced in order to enhance security against playback recordings. Each verification session requires a speaker seeking to be verified to speak a different pseudo-random sequence of words for which the system has speaker-dependent models. Thus, the required verification sentence cannot be predicted in advance, inhibiting an unauthorized speaker from pre-recording the speech of an authorized user. With the current state of the art in speech processing, however, it is realistic to imagine a computer system which is equipped with a speech recognition engine, and which has the fixed vocabulary of text segments defined. If a prerecording of all text fragments of a certain speaker is available to the computer, a speech recognition engine could be used to decode the random combination of text prompted for, and a computer program could assemble the corresponding pre-recorded speech segments. Text-prompted systems do, however, suffer from the same co-articulation problems as free-text systems.

A method called cohort normalization partially overcomes some problems of text-prompted systems by using likelihood ratio scoring. Cohort normalization is described, for example, in U.S. Pat. No. 5,675,704 to Juang et al. and U.S. Pat. No. 5,687,287 to Gandhi et al, the disclosures of which are hereby incorporated herein by reference. Likelihood ratio scoring requires that the same contexts be represented in the models of the different authorized speakers. Normalizing scores are obtained from individual reference speakers, or by models generated by pooling reference speakers. Models of bona fide registered speakers that are acoustically close to the claimant speaker are used for score normalization.

It has been shown that the cohort normalization technique can be viewed as providing a dynamic threshold which partially compensates for trial-to-trial variations. In particular, the use of cohort normalization scores compensates to some extent for microphone mismatch between a training session and subsequent test sessions. Cohort normalization has been successfully introduced in free-text systems as well, where a full acoustic model should be generated from each concurrent speaker. Speaker verification systems using cohort normalization are intrinsically language dependent, however, and speaker independent models are not commonly used for normalization purposes, mainly due to the mismatch in model accuracy of the speaker independent model and the rather poorly trained speaker dependent models.

Speaker verification systems have characterized input utterances by use of speaker-specific sub-word size (e.g., phoneme-size) hidden Markov models (HMMs). This approach changes the key text each time the system is used, thereby addressing the problem of replay attack. The speaker-specific sub-word models can be generated by speaker adaptation of a speaker-independent models. Speaker-dependent sub-word models are created for each reference speaker. These systems again need extensive training sessions.

The following references are pertinent to the present invention:

Higgins et al., "Speaker Verification Using Randomized Phrase Prompting," *Digital Signal Processing*, March 1991, pp. 89–106.

A. E. Rosenberg et al., "The Use of Cohort Normalized Scores for Speaker Verification," *Proc. 1992 ICSLP*, October. 1992, pp. 599–602.

F. K. Soong et al., "A Vector Quantisation Approach to Speaker Verification," *IEEE* 1985, pp. 38714 390.

A. E. Rosenberg et al., "Sub-word Unit Talker Verification Using Hidden Markov Models," *IEEE* 1990, pp. 269–272.

T. Masui et al., "Concatenated Phoneme Models for Text-variable Speaker Recognition," *IEEE* 1993, pp. 391–394.

J. Kuo et al., "Speaker Set Identification Through Speaker Group Modeling," *BAMFF* '92 '.

SUMMARY OF THE INVENTION

In accordance with a preferred embodiment of the invention, there is provided a method for generating a speaker-dependent model of an utterance that has at least one occurrence. In this embodiment, the method includes the steps of generating an initial model, having a first resolution, that encodes each of the occurrences of the utterance and also generating at least one additional speaker-specific model, having a different resolution from that of the initial model, of all occurrences of the utterance.

In accordance with a further embodiment, the initial model is speaker independent. Also in further embodiments, the at least one additional model has higher resolution than the initial model and is boot strapped from the initial model. In an alternative embodiment, the at least one additional model has lower resolution than the initial model and is derived from the initial model. In yet another embodiment, at least one of the models has a resolution on the subphoneme level. In accordance with a further embodiment, there is provided the additional step of determining the difference in the degree of match of the initial model and the at least one additional model to a new utterance, so as to permit discrimination on the basis of at least one of (i) speaker of the new utterance and (ii) content of the new utterance. An embodiment also additionally may utilize the match to the initial model to enhance robustness against mismatches in training and use sessions. Another embodiment of the present invention includes a method of a speaker verification system for generating multi-resolution models. The method includes providing a plurality of occurrences of an utterance, and coding each occurrence; scoring each coding against each occurrence and selecting the coding with the best score that best represents each occurrence; segmenting each occurrence according to the selected coding; creating a first resolution model from the selected coding by identifying, for each segment of the selected coding, the best coding of corresponding segments of all occurrences that best represents each segment, and replacing the corresponding segment in the selected coding, if different; creating a lower resolution model from the first resolution model for discriminating speech-only content of the utterance from non-speech sounds and noise present in the utterance; scoring each occurrence against the lower resolution model for an estimate of speech-only content of the occurrence, and storing the resulting time-normalized occurrence scores; resegmenting the speech-only content of each occurrence against the first resolution model, and storing the resulting time-normalized scores; creating a high resolution model from the first resolution model, the high resolution model being speaker specific; and rescoring the speech-only content each occurrence against the high resolution model, and storing the resulting time-normalized scores.

In a further embodiment, the first resolution model is speaker-independent. At least one of the models may have a resolution on the subphoneme level. At least one of the models may be a hidden Markov model, and may be coded using a codebook, full search nearest neighbor coding, maximal entropy coding, or binary tree coding. Such an embodiment may further include utilizing the match to the initial model to enhance robustness against mismatches in training and use sessions.

Another embodiment includes a method of speaker verification. The method includes receiving an utterance of a speaker, and decoding the utterance in terms of a high resolution model; generating a low resolution model by state to state projection; and contrasting the match of the utterance to each of the two models to provide a measure of the authenticity of the speaker. In such an embodiment the measure may be determined using fuzzy logic.

An embodiment of the present invention includes a method of speaker verification using multi-resolution models. The method includes receiving an utterance and retrieving stored model information for the utterance; estimating a fuzzy set of scores for the utterance to at least two models of different resolution for at least one bona fide user; scoring the utterance against a first one of the models to select speech-only content of the utterance, and storing the resulting time-normalized scores; resegmenting the speech-only content of the utterance to a second one of the models, and storing the resulting time-normalized scores; calculating a fuzzy membership function of the utterance to all estimated fuzzy sets; and combining different membership values of the fuzzy function to obtain a global membership function that provides an estimate of the match of the utterance to a bona fide user.

In such an embodiment, the step of estimating a fuzzy set of scores may include scores for at least one of: a comparison of the utterance to a high resolution model for a bona fide speaker; a difference in score of a test utterance of a bona fide speaker against a high resolution model and a low resolution model; a difference in score of a test utterance of a bona fide speaker against a high resolution model and a medium resolution model; and a difference in score of a test utterance of a bona fide speaker against a medium resolution model and a low resolution model. A method of speaker verification may also include performing the preceding steps for each of a plurality of trials, and updating the global membership function to reflect the result of all trials.

An embodiment of the present invention includes a multi-resolution model speaker verification system having at least one authorized user. Such a system includes a database of high resolution word models, a verification phrase generator, a verification phrase model generator, a user access device, and a verification engine. The database of high resolution word models contains word models associated with each authorized user. The verification phrase generator is in communication with the database of high resolution word models, and generates a verification phrase when a user seeks to be verified as a specific authorized user, the verification phrase containing at least one key word having a model in the database of high resolution models, and at least one other word. The verification phrase model generator is in communication with the verification phrase generator, and generates a comparison model of the verification phrase. The user access device is in communication with the verification phrase generator, and communicates the verification phrase to the user and that allows a spoken response phrase having words to be provided by the user. The verification engine is in communication with the user access device and the verification phrase model generator, and verifies the user as the specific authorized user when the response phrase matches the comparison model, and when, for the at least one key word, the models in the database of high resolution word models that are associated with the specific authorized user are within a threshold distance of corresponding words in the response phrase.

In a further embodiment, the system may include an anti-synthesis comparator in communication with the verification engine that checks the response phrase for acoustic similarity and continuity to determine if the response phrase was produced by natural speech. In such an embodiment, verification of the user as the specific authorized user by the verification engine further requires that the response phrase be determined to be produced by natural speech. In addition, or alternatively, the at least one other word in the verification phrase may have a high resolution word model from the database of high resolution word models. Or, the at least one other word in the verification phrase may have a low resolution word model from a database of low resolution word models. The user access device may include a text-to-speech module that communicates the verification phrase to the user, or an automatic speech recognition module that allows a response phrase to be provided by the user. A computer network may include such a speaker verification system in order to limit network access to authorized users.

Another embodiment includes a method of speaker verification including establishing a database of high resolution word models containing word models associated with each authorized user; generating a verification phrase with a verification phrase generator in communication with the database of high resolution word models when a user seeks to be verified as a specific authorized user, the verification phrase containing at least one key word having a model in the database of high resolution models, and at least one other word; generating a comparison model of the verification phrase with a verification phrase model generator in communication with the verification phrase generator; communicating the verification phrase to the user with a user access device in communication with the grammar compiler that allows a spoken response phrase having words to be provided by the user; and verifying the user as the specific authorized user with a verification engine in communication with the user access device and the verification model generator when the response phrase matches the comparison model, and when, for the at least one key word, the models in the database of high resolution word models that are associated with the specific authorized user are within a threshold distance of corresponding words in the response phrase.

In such an embodiment, the method may further include comparing the words in the response phrase for acoustic similarity and continuity with an anti-synthesis comparator in communication with the verification engine to determine if the response phrase was produced by natural speech; such that verifying the user as the specific authorized user further requires that the response phrase be determined to be produced by natural speech. The at least one other word in the verification phrase may have a high resolution word model from the database of high resolution word models. Or, the at least one other word in the verification phrase may have a low resolution word model from a database of low resolution word models. The user access device may include a text-to-speech module that communicates the verification phrase to the user. The user access device may include an automatic speech recognition module that allows a response phrase to be provided by the user. A computer network may employ such a speaker verification method to limit network access to authorized users.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Figure 1:
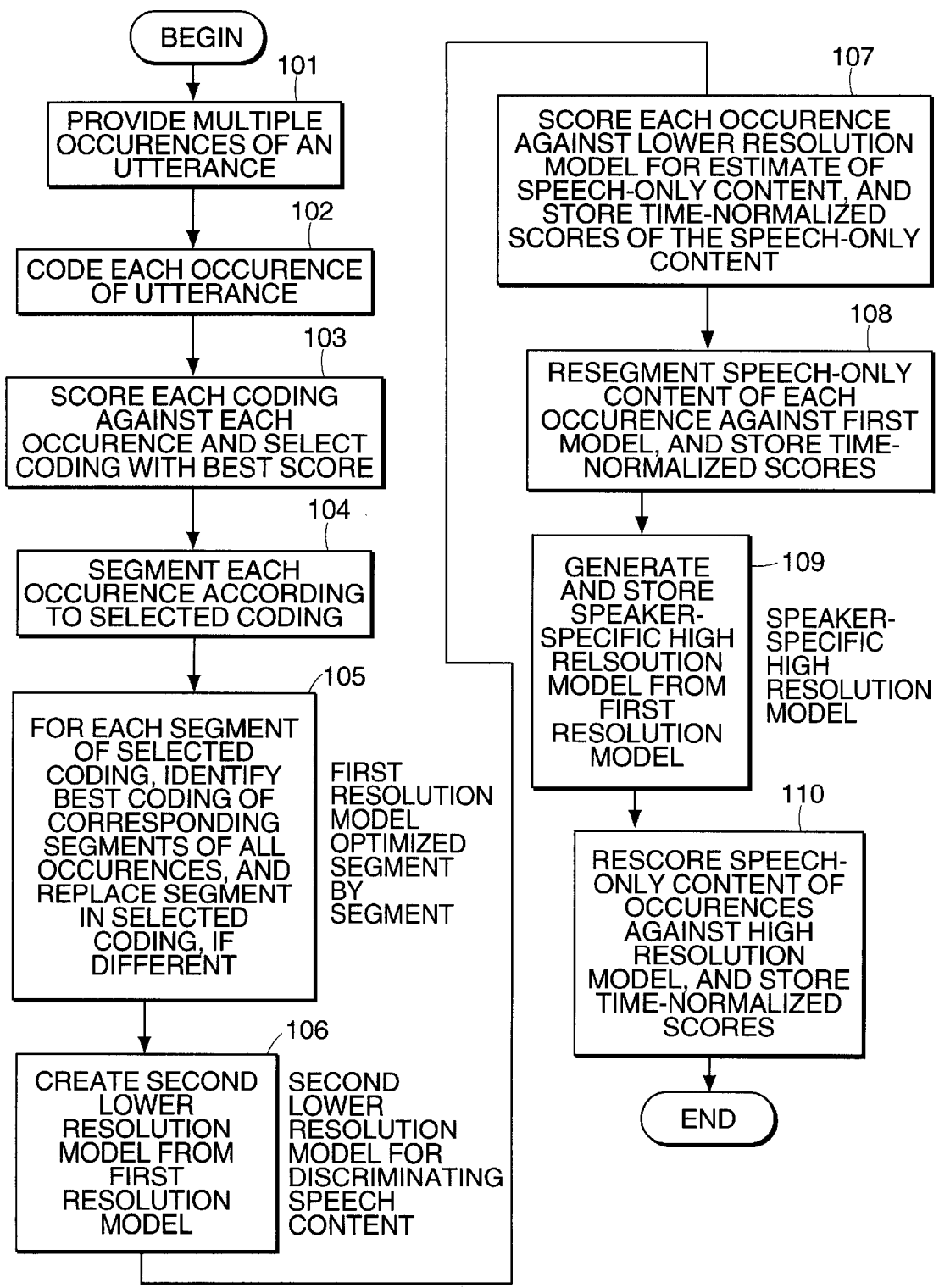
FIG. 1 shows the logical flow in accordance with a preferred embodiment of the present invention.

In FIG. 1 there is shown the logical flow used in accordance with a preferred embodiment of the invention. Initially, in accordance with step 101, there are provided multiple occurrences of an utterance. Typically, for a system vocabulary word such as a password or pass phrase, a speaker will be asked to say the word three times. Other numbers of occurrences, however, are within the scope of the invention. In accordance with an initial general speech model of typically medium resolution, in step 102, each occurrence of the utterance is coded. This initial speech model of the utterance includes the speech content of the utterance, silence, and non-speech sounds. In step 103, each coding is scored against each occurrence of the utterance. In a typical example having three occurrences and three codings, it is thus possible to obtain nine scores in step 103. In alternative embodiments, however, it is possible simply to compute a score for each coding in relation to the occurrence that it encoded. Thereafter as part of step 103, the coding is selected that has the best score indicating the coding that best represents all the occurrences.

In accordance with step 104, each occurrence of the utterance is segmented according to the selected coding. Thereafter in step 105, for each segment of the selected coding, there is identified the coding that best codes the corresponding segments of all occurrences, and the identified coding replaces the segment in the selected coding, if it is different. This produces a first resolution model for the utterance that is optimized on a segment-by-segment basis; this model is then stored. It will be appreciated, however, that steps 104 and 105 are optional, although they may significantly enhance performance.

In step 106, there is calculated a second lower resolution model derived from he first resolution model. This second lower resolution model is to assist in discriminating between speech content and silence or non-speech sounds as will be evident from the following steps. In step 107, each occurrence is scored against the second lower resolution model, so as to provide an estimate of the speech-only content; the time-normalized scores of the speech-only content are also stored. In step 108, each occurrence is resegmented to the first resolution model with a freedom limited to 50 milliseconds on each side of the speech content found in step 107, but wherein the model now includes silence but excludes non-speech sounds The result is to more accurately reflect speech-only content (than in step 105); the time-normalized scores resulting from the speech-only segmentation are stored.

In step 109, a speaker-specific high resolution model is generated by bootstrapping from the first resolution model. This speaker-specific high resolution model is used for coding the speech-only content of the occurrences. One alternative embodiment uses a codebook to code the high resolution model to reduce storage requirements. The resulting high resolution model is then stored. It is possible to use a variety of techniques to accomplish the model coding, such as full search nearest neighbor coding, maximal entropy coding, and binary tree coding. In step 110, the speech-only content of the occurrences is rescored against the high resolution model; and the time-normalized scores are stored.

The above steps are appropriate for either a speaker verification system or a user word system, but with a user word system, it is not necessary to store the scores. In a preferred embodiment, the initial model may be speaker independent and operate at the subphoneme level.

Figure 2:
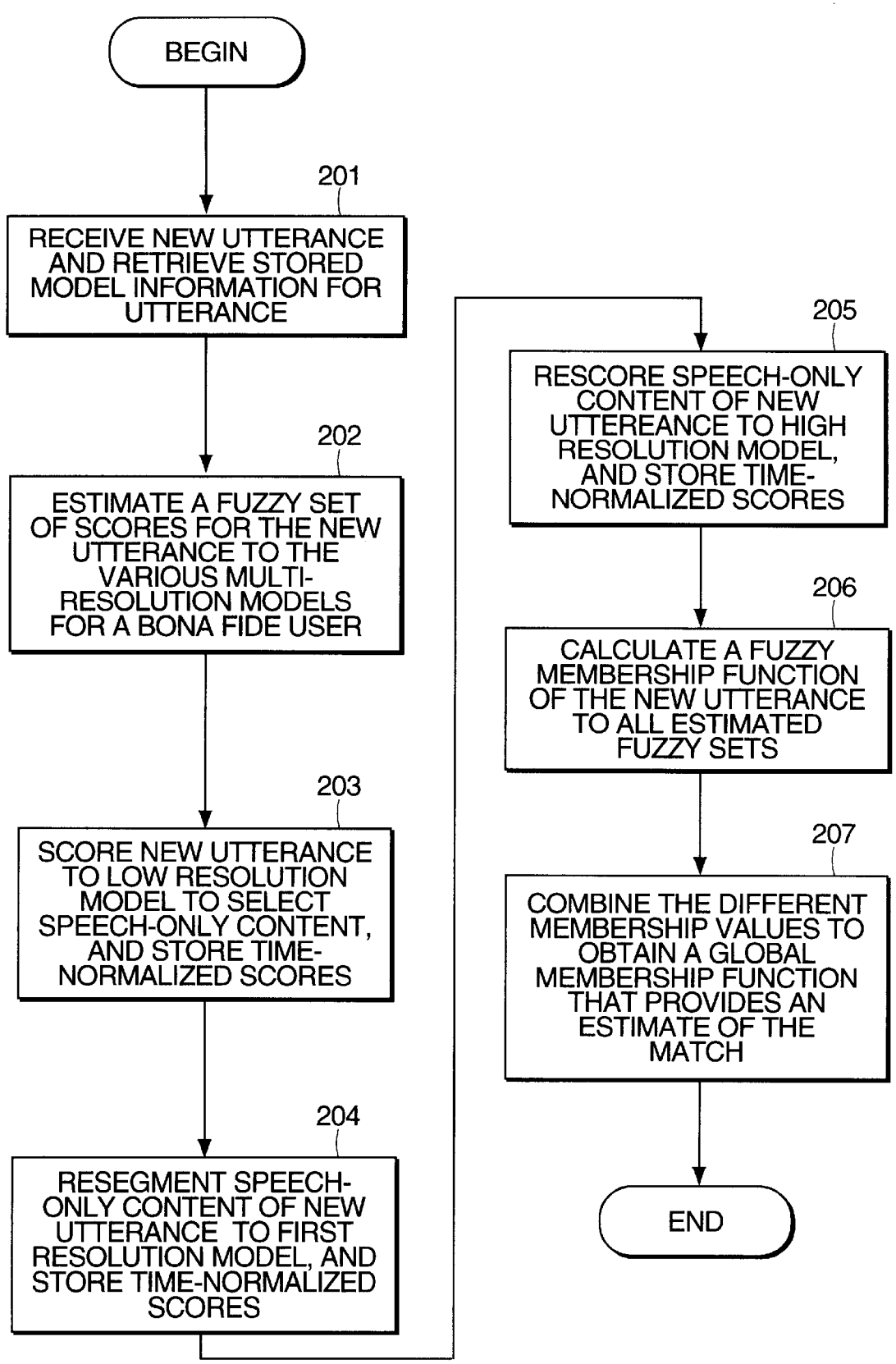
FIG. 2 illustrates the logical flow of a preferred embodiment of the present invention.

After training in accordance with a suitable embodiment of the invention, a preferred embodiment also provides for speaker verification or user word recognition in accordance with the steps shown in FIG. 2 as follows. In step 201, a new utterance is received from a user, and stored model information for the utterance is retrieved. In step 202, a fuzzy set of scores is estimated for (1) the score of the new utterance to the high resolution model for a bona fide speaker, (2) for the difference in score of a test utterance of a bona fide speaker against the high resolution and the low resolution models, and (3) for the difference in score of the high resolution model and the first resolution model. In an alternative embodiment, the fuzzy set could include the difference in score of the first resolution model and the low resolution model. In an alternative embodiment, step 202 may be performed as part of the training process shown in FIG. 1.

The new utterance is processed, in step 203, by first scoring the new utterance to the low resolution model so as to select the speech-only content, and the time-normalized scores are stored. In step 204, the speech-only content of the new utterance is resegmented to the first resolution model with a freedom limited to 50 milliseconds on each side of the speech content found in step 203, so as to more accurately reflect speech-only content (than in step 203). The time-normalized scores resulting from this speech-only segmentation are also stored in step 204. Then, in step 205, the speech-only content of the new utterance is rescored to the speaker-specific high resolution model, and the resulting time-normalized scores are stored. In step 206, a fuzzy membership function of the new utterance is calculated with respect to all estimated fuzzy sets, and in step 207, the different membership values are combined to obtain a global membership function that provides an estimate of the match of the new utterance.

In embodiments for user words, rather than speaker verification, it is not necessary to estimate fuzzy sets; one simply uses the time-normalized scores to select the closest word or phrase. However the use of fuzzy sets for speaker verification provides a valuable tool for providing an enhanced measure of the degree of match. Such an approach permits meaningful utilization of multi-trial information, and handles with greater sophistication data that could potentially yield ambiguous interpretations in other modes of analysis. The use of a global fuzzy function is therefore a powerful tool. A preferred embodiment aggregates match scores over multiple trials, and depends on a good aggregate for a positive verification; in this manner, an imposter in multiple trials is not rewarded. Note that in such a preferred embodiment, utterance repetition benefits a bona fide user while penalizing an imposter.

Figure 3:
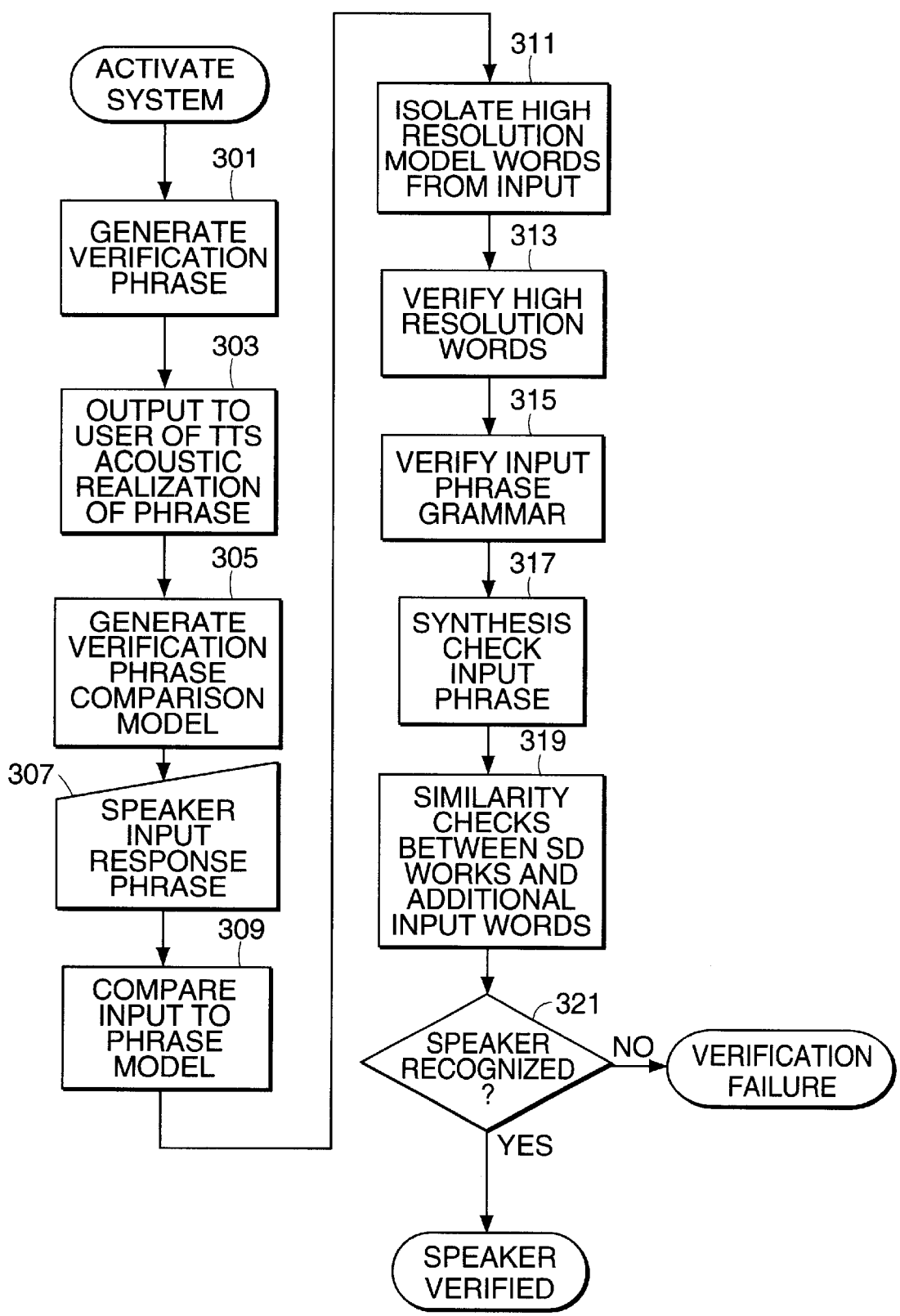
FIG. 3 illustrates the logical flow of a replay safe speaker verification system using multi-resolution models as in preferred embodiment of the present invention.
Figure 4:
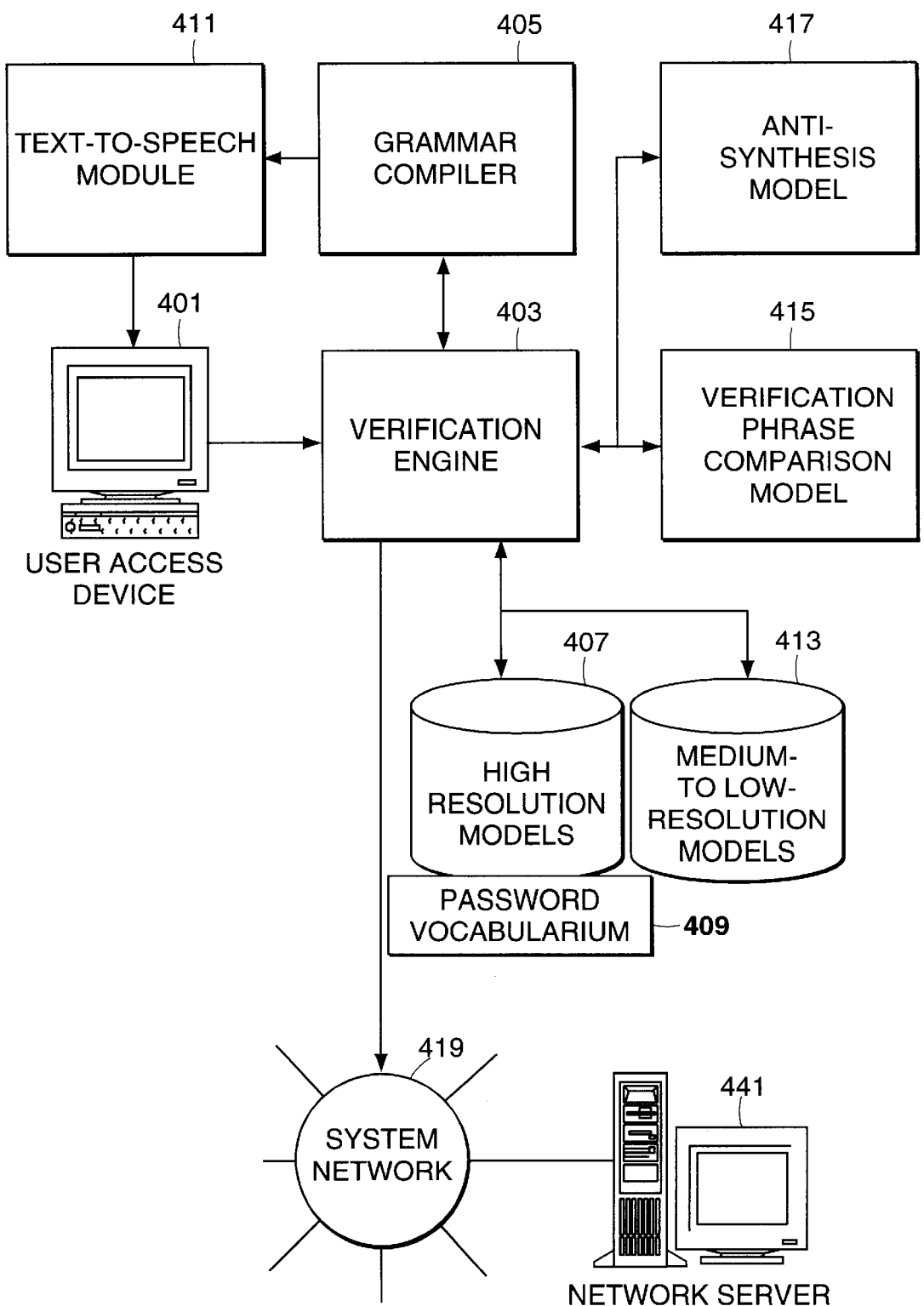
FIG. 4 is a system diagram of a speaker verification system using the method in FIG. 3.

Another preferred embodiment of the present invention includes a text-prompted speaker verification system using multi-resolution models that is embedded in a replay-safe shell. FIG. 3 illustrates the logical flow of a such an embodiment, and FIG. 4 is a system diagram of such an embodiment. Each time a speaker identity is to be verified, the system requests the speaker to provide his or her identity, and additional speech that includes some previously trained key words for which high-resolution models are available, e.g., speaker-dependent models. The requested speech also includes some extra words for which medium- to low-resolution models may be used, e.g., speaker-independent models. The verification determination of user identity is controlled by the high-resolution model comparison of the key words, while the medium- to low-resolution models of the extra words are used to check against recorded replay or other synthesis of authorized user speech.

Initially, each new user must be enrolled in the system. A training session is performed by the user via a user access device 401 which, in a representative embodiment, may be, for example, an appropriately programmed computer network workstation having a microphone, a sound card, and speakers. During the training session, the user performs repetitions of key words in a password vocabularium 409 in order to train a database of high resolution models 407 which may include word models and/or sub-word models such as phoneme models. In addition, training in a preferred embodiment may also include further training of additional full acoustic high resolution models which also may be included in the database of high resolution models 407. This training may be by speaker adaptation of full phonetic high resolution models, or by a vector quantization (VQ) adaptation process.

After the initial enrollment model training session, a preferred embodiment of the speaker verification system may be used to limit user access to a computer network system to authorized users enrolled in the speaker verification system. A speaker verification session commences when a user at the user access device 401 seeks access to the computer system network 419.

The verification engine 403 directs a verification phrase generator 405 to generate at least one verification phrase, step 301. The at least one verification phrase includes one or more key words pseudo-randomly chosen from a password vocabularium 409 for which there are corresponding models in the database of high resolution models 407. The generated verification phrase also includes one or more extra words for which models are generated-either from a database of high-resolution all-word or phonetic models 407, or from a database of medium- to low-resolution all-word or phonetic models 413. In a preferred embodiment, the verification phrase generator 405 uses a language model and a grammar in generating the verification phrase, and has a high enough perplexity that replay or synthesis of the verification phrase is prevented. An acoustic realization of the verification phrase is then output to the user, step 303, by a text-to-speech module 411.

In addition, a verification phrase model generator 416, in step 305, generates a comparison model of the verification phrase 415 which may be medium- to low-resolution, high-resolution, or a combination form. Such multi-resolution models may be produced in the manner described above in connection with FIGS. 1 and 2.

The speaker provides the requested input response phrase, step 307, which the verification engine 403 compares in step 309 to the verification phrase comparison model 415. This step ensures that the word sequence of the input response speech matches the word sequence of the verification phrase to ensure that the input response phrase was instantaneously and naturally generated. In addition, the verification phrase comparison model 415 may also be used as the basis for an overall speaker verification score which reflects the closeness of match between the input response phrase and the verification phrase comparison model 415.

The verification engine 403 then, in step 311, isolates the high resolution key words, either by segmentation on the phrase comparison model, or by use of a word-spotting algorithm. The verification engine 403, in step 313, compares the isolated key words to their corresponding models in the database of high resolution models 407. The high resolution key word models are also used, in step 315, to verify that the grammar of the input response phrase reflects the correct sequence of key words as specified by the verification phrase. The high resolution models 407 of the keywords in the input response phrase have been previously trained on the authorized user, and, therefore, provide a highly accurate indication of the closeness of match between the keywords embedded in the verification phrase and the keywords extracted from the input response phrase. The scores from the overall comparison of step 309 and the high resolution comparisons of steps 313 and 315 should all be consistent with each other for a high confidence verification.

A preferred embodiment also includes an anti-synthesis comparator 417 which, in step 317, performs anti-synthesis checks of the continuity of the speech input, background noise, and reverberant conditions. Similarity checks are also performed, in step 319, between the high resolution modeled words and the additional input words, including border continuity checks between the key words and the additional input speech words and similarity checks of the acoustical subsegments realized in the verification passwords and extra speech. The antisynthesis checks of step 317 and similarity checks of step 319 verify that the input response phrase is not electronically concatenated or otherwise synthesized, but results from naturally produced speech.

What is claimed is:

1. A multi-resolution model speaker verification system having at least one authorized user, the system comprising:
   a database of high resolution word models containing word models associated with each authorized user;
   a verification phrase generator in communication with the database of high resolution word models that generates a verification phrase when a user seeks to be verified as a specific authorized user, the verification phrase containing at least one key word having a model in the database of high resolution models, and at least one other word;
   a verification phrase model generator in communication with the verification phrase generator that generates a comparison model of the verification phrase;
   a user access device in communication with the verification phrase generator that communicates the verification phrase to the user and that allows a spoken response phrase having words to be provided by the user;
   an anti-synthesis comparator that checks the response phrase for acoustic similarity and continuity to determine if the response phrase was produced by natural speech; and
   a verification engine in communication with the user access device, the anti-synthesis comparator, and the verification phrase model generator that verifies the user as the specific authorized user when:
   (i) the response phrase matches the comparison model,
   (ii) for the at least one key word, the models in the database of high resolution word models that are associated with the specific authorized user are within a threshold distance of corresponding words in the response phrase, and
   (iii) the anti-synthesis comparator determines that the response phrase was produced by natural speech.

2. A system as in claim 1, wherein the at least one other word in the verification phrase has a high resolution word model from the database of high resolution word models.

3. A system as in claim 1, wherein the at least one other word in the verification phrase has a low resolution word model from a database of low resolution word models.

4. A system as in claim 1, wherein the user access device includes a text-to-speech module that communicates the verification phrase to the user.

5. A system as in claim 1, wherein the user access device includes an automatic speech recognition module that allows a response phrase to be provided by the user.

6. A computer network including the speaker verification system of claim 1 to limit network access to authorized users.

7. A method of speaker verification comprising:
   establishing a database of high resolution word models containing word models associated with each authorized user;
   generating a verification phrase with a verification phrase generator in communication with the database of high resolution word models when a user seeks to be verified as a specific authorized user, the verification phrase containing at least one key word having a model in the database of high resolution models, and at least one other word;
   generating a comparison model of the verification phrase with a verification phrase model generator in communication with the verification phrase generator;
   communicating the verification phrase to the user with a user access device in communication with the grammar compiler that allows a spoken response phrase having words to be provided by the user;
   checking the words in the response phrase for acoustic similarity and continuity with an anti-synthesis comparator to determine if the response phrase was produced by natural speech; and
   verifying the user as the specific authorized user with a verification engine in communication with the user access device and the verification model generator when:
   (i) the response phrase matches the comparison model,
   (ii) for the at least one key word, the models in the database of high resolution word models that are associated with the specific authorized user are within a threshold distance of corresponding words in the response phrase, and
   (iii) the response phrase has been determined by the anti-synthesis comparator to be produced by natural speech.

8. A method as in claim 7, wherein the at least one other word in the verification phrase has a high resolution word model from the database of high resolution word models.

9. A method as in claim 7, wherein the at least one other word in the verification phrase has a low resolution word model from a database of low resolution word models.

10. A method as in claim 7, wherein the user access device includes a text-to-speech module that communicates the verification phrase to the user.

11. A method as in claim 7, wherein the user access device includes an automatic speech recognition module that allows a response phrase to be provided by the user.

12. A computer network employing the speaker verification method of claim 7 to limit network access to authorized users.

* * * * *